(12) United States Patent
Ohige et al.

(10) Patent No.: US 12,370,670 B2
(45) Date of Patent: Jul. 29, 2025

(54) DUAL-ARM ROBOT SYSTEM

(71) Applicant: KAWASAKI JUKOGYO KABUSHIKI KAISHA, Kobe (JP)

(72) Inventors: Takashi Ohige, Kobe (JP); Keisuke Mukai, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 57 days.

(21) Appl. No.: 18/261,283

(22) PCT Filed: Jan. 12, 2022

(86) PCT No.: PCT/JP2022/000651
§ 371 (c)(1),
(2) Date: Jul. 13, 2023

(87) PCT Pub. No.: WO2022/153994
PCT Pub. Date: Jul. 21, 2022

(65) Prior Publication Data
US 2024/0300087 A1 Sep. 12, 2024

(30) Foreign Application Priority Data
Jan. 14, 2021 (JP) .................................. 2021-004006

(51) Int. Cl.
*B25J 9/16* (2006.01)
*B25J 9/00* (2006.01)
*B25J 9/04* (2006.01)
*B25J 9/06* (2006.01)

(52) U.S. Cl.
CPC ............. *B25J 9/0087* (2013.01); *B25J 9/043* (2013.01); *B25J 9/044* (2013.01); *B25J 9/06* (2013.01); *B25J 9/1664* (2013.01); *B25J 9/1676* (2013.01); *B25J 9/1682* (2013.01); G05B 2219/39083 (2013.01); G05B 2219/39096 (2013.01);
(Continued)

(58) Field of Classification Search
CPC . B25J 9/0087; B25J 9/043; B25J 9/044; B25J 9/06; B25J 9/1664; B25J 9/1676; B25J 9/1682; G05B 2219/39083; G05B 2219/39096; G05B 2219/40301; G05B 2219/40307; G05B 2219/40492; G05B 2219/49137
See application file for complete search history.

(56) References Cited

U.S. PATENT DOCUMENTS

2007/0282485 A1 12/2007 Nagatsuka et al.
2008/0282821 A1* 11/2008 Tokumitsu ............ B25J 18/025
74/25
(Continued)

FOREIGN PATENT DOCUMENTS

JP S64-84310 A 3/1989
JP 2001-315087 A 11/2001
(Continued)

Primary Examiner — Dale Moyer
(74) Attorney, Agent, or Firm — Oliff PLC

(57) ABSTRACT

A dual-arm robot system includes a controller configured or programmed to determine whether or not interference determination targets interfere with each other based on whether or not three-dimensional models generated with a plurality of portions including at least a hand among the hand, a horizontal link, and a body as the interference determination targets overlap each other.

20 Claims, 13 Drawing Sheets

(52) U.S. Cl.
CPC .............. *G05B 2219/40301* (2013.01); *G05B 2219/40307* (2013.01); *G05B 2219/40492* (2013.01); *G05B 2219/49137* (2013.01)

(56) References Cited

U.S. PATENT DOCUMENTS

| | | | |
|---|---|---|---|
| 2012/0215351 A1* | 8/2012 | McGee | .................. B25J 9/1676 |
| | | | 700/248 |
| 2015/0328776 A1 | 11/2015 | Shiratsuchi | |
| 2018/0370043 A1* | 12/2018 | Hashimoto | .......... B25J 15/0019 |
| 2020/0139542 A1* | 5/2020 | Hashimoto | .......... B25J 17/0283 |
| 2020/0368862 A1 | 11/2020 | Hirata et al. | |
| 2021/0107137 A1 | 4/2021 | Ohige et al. | |
| 2022/0080582 A1* | 3/2022 | Sekimoto | ................... B25J 9/10 |

FOREIGN PATENT DOCUMENTS

| | | | | |
|---|---|---|---|---|
| JP | 2007-272309 A | | 10/2007 | |
| JP | 2007-326160 A | | 12/2007 | |
| JP | 2010-94794 A | | 4/2010 | |
| JP | 2011-11263 A | | 1/2011 | |
| JP | 2011-79105 A | | 4/2011 | |
| JP | 2012-61582 A | | 3/2012 | |
| JP | 2013-136109 A | | 7/2013 | |
| JP | WO2014/122995 A1 | | 2/2017 | |
| JP | 2019-912 A | | 1/2019 | |
| JP | 2019-136834 A | | 8/2019 | |
| JP | 2019-171501 A | | 10/2019 | |
| JP | 2020-1103 A | | 1/2020 | |
| JP | 2020001103 A | * | 1/2020 | ............ B25J 13/006 |
| KR | 101012742 B1 | * | 2/2011 | ............ B25J 9/1682 |

* cited by examiner

FIG.4

|  | OWN SIDE | OTHER SIDE | | | | OTHERS | | |
| --- | --- | --- | --- | --- | --- | --- | --- | --- |
|  | HAND | FIRST HORIZONTAL LINK | SECOND HORIZONTAL LINK | VERTICAL LINK | HAND | BODY | HOUSING | SURROUNDING OBJECT |
| FIRST HORIZONTAL LINK | ○ | × | ○ | ○ | ○ | × | × | ○ |
| SECOND HORIZONTAL LINK | ○ | ○ | ○ | ○ | ○ | × | × | ○ |
| VERTICAL LINK | ○ | ○ | ○ | ○ | ○ | × | × | ○ |
| HAND |  | ○ | ○ | ○ | ○ | ○ | ○ | ○ |

FIG. 13

| | OWN SIDE | OTHER SIDE | | | | | | | OTHERS | | |
|---|---|---|---|---|---|---|---|---|---|---|---|
| | HAND | FIRST HORIZONTAL LINK | SECOND HORIZONTAL LINK | HAND ATTACHMENT MEMBER | HAND | COVER | PLATE-SHAPED MEMBER A | PLATE-SHAPED MEMBER B | BODY | HOUSING | SURROUNDING OBJECT |
| FIRST HORIZONTAL LINK | O | × | O | O | O | O | O | O | × | × | O |
| SECOND HORIZONTAL LINK | O | O | O | O | O | O | O | O | × | × | O |
| HAND ATTACHMENT MEMBER | O | O | O | O | O | O | O | O | × | × | O |
| COVER | O | O | O | O | O | O | O | O | × | × | O |
| PLATE-SHAPED MEMBER A | O | O | O | O | O | O | O | O | × | × | O |
| PLATE-SHAPED MEMBER B | O | O | O | O | O | O | O | O | × | × | O |
| HAND | | O | O | O | O | O | O | O | O | O | O |

DUAL-ARM ROBOT SYSTEM

TECHNICAL FIELD

The present disclosure relates to a dual-arm robot system.

BACKGROUND ART

Conventionally, a dual-arm robot system that determines whether or not links interfere with each other is known. Such a dual-arm robot system is disclosed in Japanese Patent Laid-Open No. 2013-136109, for example.

Japanese Patent Laid-Open No. 2013-136109 discloses a dual-arm robot system including a dual-arm robot and an interference determiner that determines interference of the dual-arm robot. In Japanese Patent Laid-Open No. 2013-136109, the dual-arm robot includes a pair of horizontal articulated arms attached to a support base. The pair of horizontal articulated arms each include a first link and a second link. A first end of the first link is attached to the support base. A first end of the second link is attached to a second end of the first link. The pair of horizontal articulated arms are attached to the support base while being spaced apart from each other. That is, rotation axes (rotation axes with respect to the support base) at the first ends of the first links of the pair of horizontal articulated arms are spaced apart from each other.

The interference determiner disclosed in Japanese Patent Laid-Open No. 2013-136109 determines whether or not portions of the dual-arm robot interfere with each other when the dual-arm robot operates. Specifically, the interference determiner determines whether or not the first link and the second link three-dimensionally interfere with each other.

PRIOR ART

Patent Document

Patent Document 1: Japanese Patent Laid-Open No. 2013-136109

SUMMARY OF THE INVENTION

In a conventional dual-arm robot as disclosed in Japanese Patent Laid-Open No. 2013-136109, hands are attached to the tip ends of horizontal articulated arms. Even when portions of the horizontal articulated arms other than the hands do not interfere with each other, the hands and other portions may disadvantageously interfere with each other.

The present disclosure is intended to solve the above problems. The present disclosure aims to provide a dual-arm robot system capable of reducing or preventing interference between hands and other portions.

In order to attain the aforementioned object, a dual-arm robot system according to a first aspect of the present disclosure includes a first robot arm and a second robot arm each including a horizontal link to which a hand is attached, the horizontal link being operable to rotate along a horizontal plane, a body to support the first robot arm and the second robot arm such that the first robot arm and the second robot arm coaxially rotate, and a controller configured or programmed to determine whether or not interference determination targets interfere with each other based on whether or not three-dimensional models generated with a plurality of portions including at least the hand among the hand, the horizontal link, and the body as the interference determination targets overlap each other.

In the dual-arm robot system according to the first aspect of the present disclosure, as described above, the controller is configured or programmed to determine whether or not the interference determination targets interfere with each other based on whether or not the three-dimensional models generated with the plurality of portions including at least the hand among the hand, the horizontal link, and the body as the interference determination targets overlap each other. Accordingly, mutual interference between the interference determination targets including at least the hand is determined, and thus operations that cause the hand and other portions to interfere with each other can be reduced or prevented. Consequently, interference between the hand and other portions can be reduced or prevented.

In the dual-arm robot system according to the first aspect, as described above, the body supports the first robot arm and the second robot arm such that the first robot arm and the second robot arm coaxially rotate. When the first robot arm and the second robot arm rotate about different axes, the first robot arm and the second robot arm need to be spaced apart from each other. Therefore, the size of the dual-arm robot system is increased. On the other hand, in the dual-arm robot system according to the first aspect, the first robot arm and the second robot arm coaxially rotate, and thus the first robot arm and the second robot arm can be arranged with a small distance therebetween. Thus, the size of the dual-arm robot system can be decreased.

A dual-arm robot system according to a second aspect of the present disclosure includes a first robot arm and a second robot arm each including a horizontal link to which a hand is attached, the horizontal link being operable to rotate along a horizontal plane, a body to support the first robot arm and the second robot arm such that the first robot arm and the second robot arm rotate, and a controller configured or programmed to determine whether or not interference determination targets interfere with each other based on whether or not three-dimensional models generated with a plurality of portions including at least the hand among the hand, the horizontal link, and the body as the interference determination targets overlap each other, and the controller is provided in common for the first robot arm and the second robot arm.

In the dual-arm robot system according to the second aspect of the present disclosure, as described above, the controller is configured or programmed to determine whether or not the interference determination targets interfere with each other based on whether or not the three-dimensional models generated with the plurality of portions including at least the hand among the hand, the horizontal link, and the body as the interference determination targets overlap each other. Accordingly, mutual interference between the interference determination targets including at least the hand is determined, and thus operations that cause the hand and other portions to interfere with each other can be reduced or prevented. Consequently, interference between the hand and other portions can be reduced or prevented.

In the dual-arm robot system according to the second aspect, as described above, the controller is provided in common for the first robot arm and the second robot arm. Accordingly, the configuration of the dual-arm robot system can be simplified (downsized) as compared with a case in which the controller is provided individually for each of the first robot arm and the second robot arm. Furthermore, the controller is provided in common for the first robot arm and the second robot arm, and thus the dual-arm robot system can be space-saving, low-cost, and easy to operate. Moreover, unlike a case in which controllers provided separately for the first robot arm and the second robot arm determine interference while communicating with each other, interference can be accurately determined while a delay in determination is reduced or prevented. In addition, the controller is configured or programmed to control the operations of the first robot arm and the second robot arm in addition to determination of interference such that delays in operations for avoiding interference can be reduced or prevented, unlike a case in which separate controllers control the operations of the first robot arm and the second robot arm.

According to the present disclosure, as described above, it is possible to reduce or prevent interference between the hand and other portions.

BRIEF DESCRIPTION OF THE DRAWINGS

FIG. 4 is a diagram for illustrating interference determination targets of the dual-arm robot system according to the first embodiment.

FIG. 13 is a diagram for illustrating interference determination targets of the dual-arm robot system according to the second embodiment.

MODES FOR CARRYING OUT THE INVENTION

Figure 1:
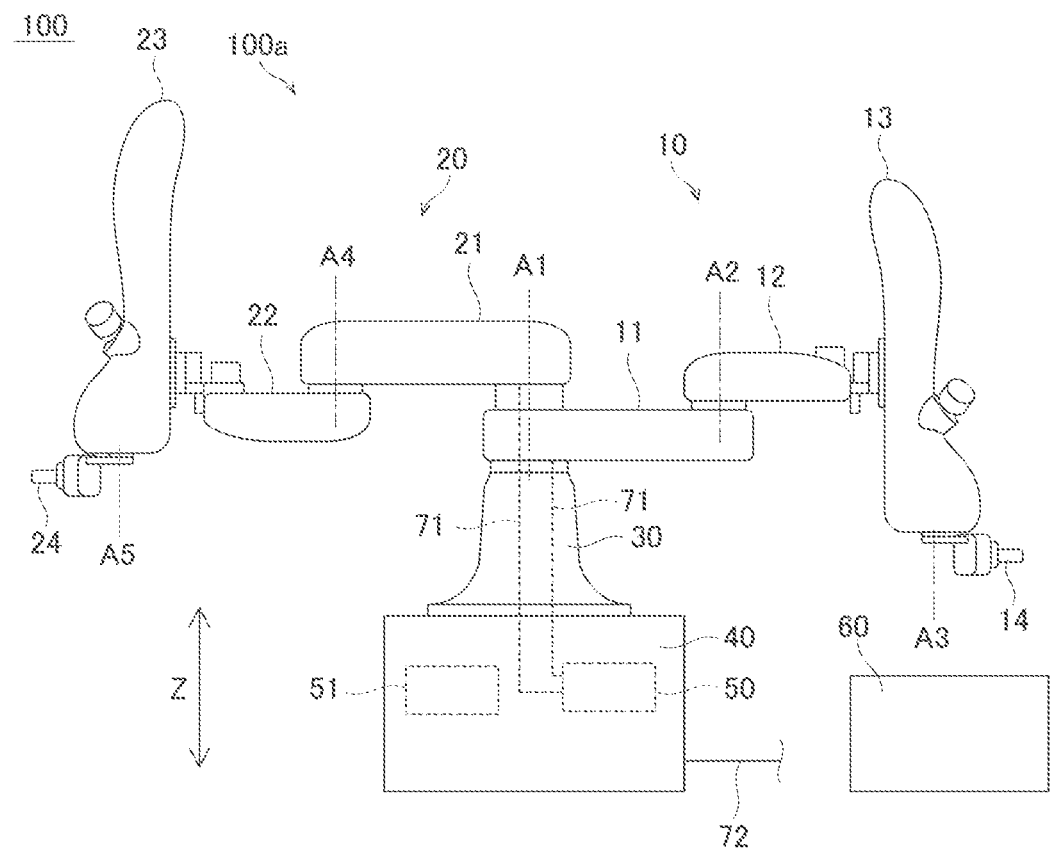
FIG. 1 is a side view of a dual-arm robot system according to a first embodiment.

Embodiments embodying the present disclosure are hereinafter described on the basis of the drawings.

First Embodiment

The configuration of a dual-arm robot system 100 according to a first embodiment is now described with reference to FIGS. 1 to 7.

The dual-arm robot system 100 includes a first robot arm 10. The first robot arm 10 includes horizontal links that rotate along a horizontal plane. The horizontal links include a first horizontal link 11 rotatably connected to a body 30 and a second horizontal link 12 rotatably connected to the first horizontal link 11. Specifically, a first end of the first horizontal link 11 is rotatably attached to an upper portion of the body 30. A second end of the first horizontal link 11 is attached to a first end of the second horizontal link 12. A vertical link 13 is attached to a second end of the second horizontal link 12. The first horizontal link 11 and the second horizontal link 12 are examples of a horizontal link.

The first robot arm 10 also includes the vertical link 13. The vertical link 13 is provided on the tip end side of the first robot arm 10. The vertical link 13 moves along a vertical direction. The vertical link 13 is an example of a first vertical link.

A hand 14 is attached to the first robot arm 10. The hand 14 is attached to a lower end of the vertical link 13. The hand 14 includes a chuck that grips a workpiece, for example.

The dual-arm robot system 100 also includes a second robot arm 20. The configuration of the second robot arm 20 is similar to that of the first robot arm 10. That is, the second robot arm 20 includes a first horizontal link 21, a second horizontal link 22, and a vertical link 23. A hand 24 is attached to the second robot arm 20. The first horizontal link 21 and the second horizontal link 22 are examples of a horizontal link. The vertical link 23 is an example of a first vertical link.

The dual-arm robot system 100 also includes the body 30. The first robot arm 10 and the second robot arm 20 are supported by the body 30 so as to coaxially rotate. Specifically, the first end of the first horizontal link 11 and a first end of the first horizontal link 21 coaxially rotate. The first end of the first horizontal link 21 is arranged above the first horizontal link 11. The first end of the first horizontal link 21 is rotatably attached to the body 30 via the first horizontal link 11.

The dual-arm robot 100a of the dual-arm robot system 100 includes the first robot arm 10, the second robot arm 20, and the body 30.

In the dual-arm robot 100a, the first end of the first horizontal link 11 rotates about an A1 axis. The second end of the first horizontal link 11 (the first end of the second horizontal link 12) rotates about an A2 axis. The hand 14 rotates about an A3 axis.

In the dual-arm robot 100a, the first end of the first horizontal link 21 rotates about the A1 axis. A second end of the first horizontal link 21 (a first end of the second horizontal link 22) rotates about an A4 axis. The hand 24 rotates about an A5 axis. The A1 to A5 axes are vertical axes, and are arranged parallel to each other.

The dual-arm robot system 100 also includes a housing 40. The body 30 is placed on the housing 40. A controller 50 described below is arranged inside the housing 40.

First cables 71 are provided inside the housing 40 and the body 30 to connect the controller 50 arranged inside the housing 40 to the first robot arm 10 and the second robot arm 20. A second cable 72 is provided outside the housing 40 and the body 30. The first cables 71 are signal lines for controlling drives of the first robot arm 10 and the second robot arm 20, for example. The second cable 72 is a power supply cable for supplying power to the dual-arm robot system 100, or an external communication cable for communication between the dual-arm robot system 100 and the outside, for example.

In this embodiment, the drives are achieved by servomotors, for example. A position sensor (not shown) such as an encoder that detects the rotational angular position of the servomotor is provided on each servomotor. The rotational angular position is the angular position of each joint in a joint coordinate system of each servomotor. The controller 50 controls the positions of the servomotors such that the first robot arm 10 and the second robot arm 20 take arbitrary postures.

An object 60 (obstacle) is arranged around the first robot arm 10 and the second robot arm 20.

Figure 2:
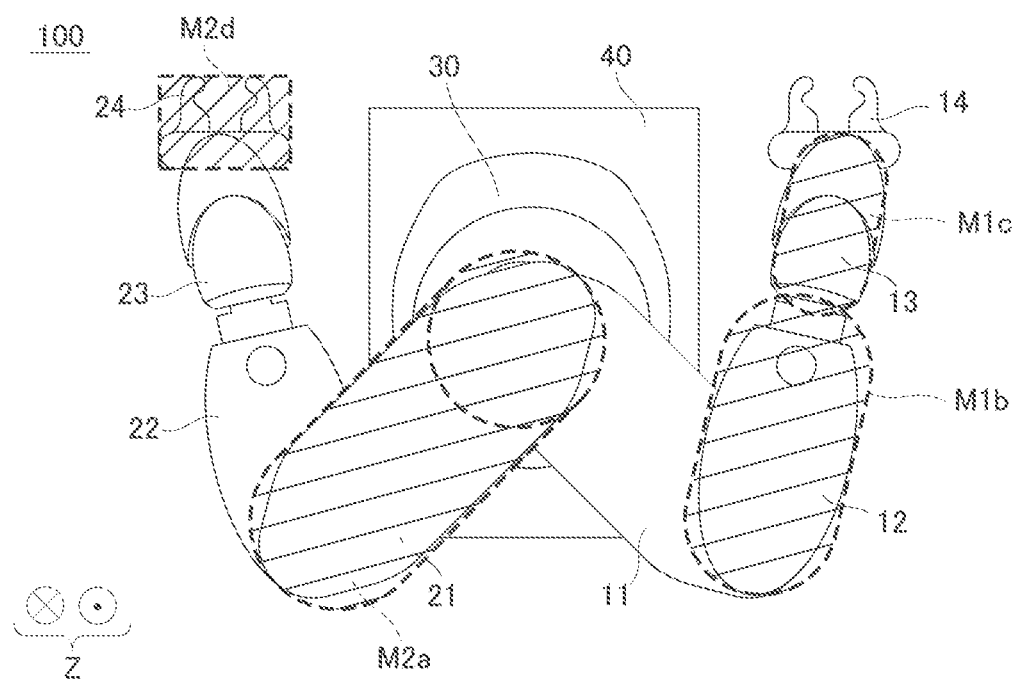
FIG. 2 is a top view of the dual-arm robot system according to the first embodiment.
Figure 3:
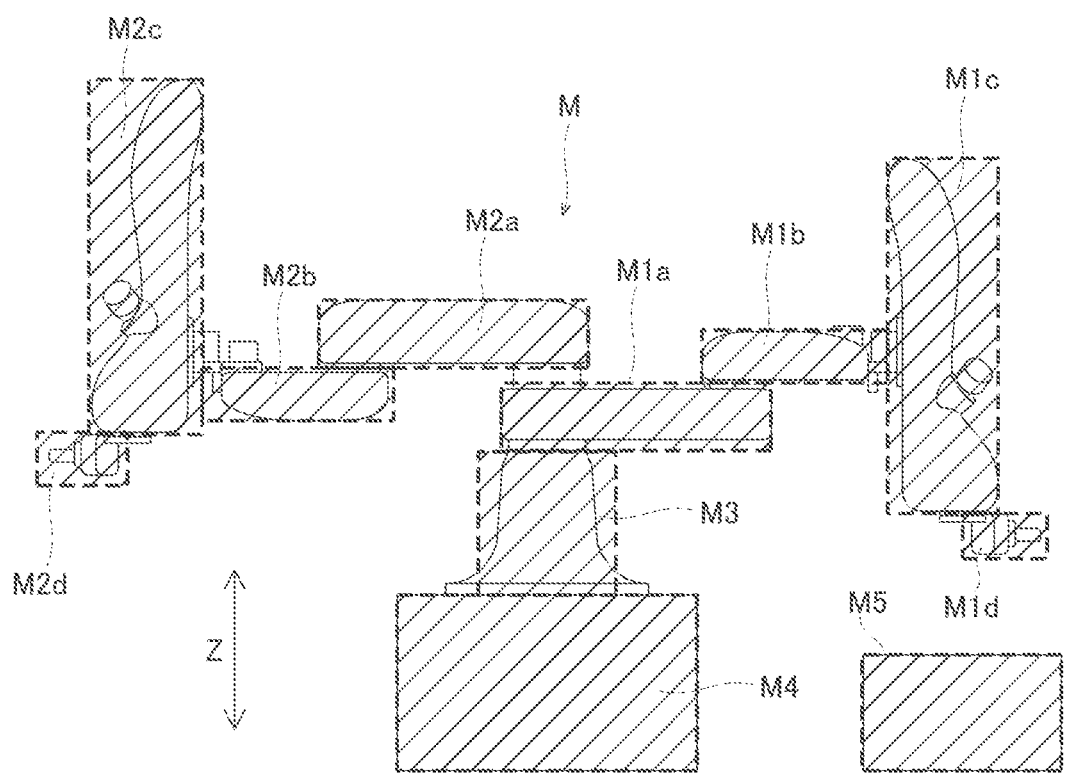
FIG. 3 is a diagram showing three-dimensional models of the dual-arm robot system according to the first embodiment.

In the first embodiment, the dual-arm robot system 100 includes the controller 50, as shown in FIGS. 2 and 3. The controller 50 determines whether or not interference determination targets interfere with each other based on whether or not three-dimensional models M generated with a plurality of portions including at least the hands (14 and 24) among the hands (14 and 24), the horizontal links (11, 12, 21, and 22), and the body 30 as the interference determination targets overlap each other. Specifically, in the first embodiment, the controller 50 sets the hand 14 of the first robot arm 10, the first horizontal link 11, the second horizontal link 12, and the vertical link 13 as the interference determination targets. Furthermore, the controller 50 sets the hand 24 of the second robot arm 20, the first horizontal link 21, the second horizontal link 22, and the vertical link 23 as the interference determination targets. Moreover, the controller 50 sets the body 30 and the housing 40 as the interference determination targets. A three-dimensional model M is generated (set) individually for all of the interference determination targets described above.

In the first embodiment, three-dimensional models M of the horizontal links (the first horizontal link 11, the second horizontal link 12, the first horizontal link 21, and the second horizontal link 22) are set based on a coordinate system of the body 30. A three-dimensional model M3 of the body 30 is set based on the coordinate system of the body 30. A three-dimensional model M4 of the housing 40 is set based on the coordinate system of the body 30. On the other hand, three-dimensional models M of the hands (hands 14 and 24) are set based on the tip end coordinates of the hands (14 and 24).

A three-dimensional model M1a of the first horizontal link 11 of the first robot arm 10 has a substantially elliptical shape along the shape of the first horizontal link 11, as viewed from above, for example. The Z-direction length of the three-dimensional model M1a of the first horizontal link 11 is a length corresponding to the Z-direction length of the first horizontal link 11. The same applies to a three-dimensional model M1b of the second horizontal link 12 of the first robot arm 10. The same applies to a three-dimensional model M2a of the first horizontal link 21 of the second robot arm 20 and a three-dimensional model M2b of the second horizontal link 22.

A three-dimensional model M1c of the vertical link 13 of the first robot arm 10 has a substantially elliptical shape along the shape of the vertical link 13, as viewed from above, for example. The Z-direction length of the three-dimensional model M1c of the vertical link 13 is a length corresponding to the Z-direction length of the vertical link 13. The same applies to a three-dimensional model M2c of the vertical link 23 of the second robot arm 20.

A three-dimensional model M1d of the hand 14 of the first robot arm 10 has a substantially rectangular shape along the shape of the hand 14, as viewed from above, for example. The Z-direction length of the three-dimensional model M1d of the hand 14 is a length corresponding to the Z-direction length of the hand 14. The same applies to a three-dimensional model M2d of the hand 24 of the second robot arm 20.

The three-dimensional model M3 of the body 30 has a substantially circular shape along the shape of the body 30, as viewed from above, for example. The Z-direction length of the three-dimensional model M3 of the body 30 is a length corresponding to the Z-direction length of the body 30.

The three-dimensional model M4 of the housing 40 has a substantially rectangular shape along the shape of the housing 40, as viewed from above, for example. The Z-direction length of the three-dimensional model M4 of the housing 40 is a length corresponding to the Z-direction length of the housing 40.

A three-dimensional model M5 of the object 60 arranged around the first robot arm 10 and the second robot arm 20 has a shape along the shape of the object 60, as viewed from above. The Z-direction length of the three-dimensional model M5 of the object 60 is a length corresponding to the Z-direction length of the object 60.

In the first embodiment, the dual-arm robot system 100 includes a storage 51, as shown in FIG. 1. The storage 51 is arranged inside the housing 40, for example. The three-dimensional models M (M1a to M1d, M2a to M2d, M3, M4, and M5) are stored in advance in the storage 51. The shapes (such as the lengths) of the three-dimensional models M are fixed. The housing 40 (controller 50) is moved together with the dual-arm robot 100a. Thus, unlike a case in which the housing 40 (controller 50) and the dual-arm robot 100a are arranged separately, the relative position between the housing 40 (controller 50) and the dual-arm robot 100a does not change, and thus interference with the housing 40 can be easily determined.

In the first embodiment, the controller 50 determines whether or not the interference determination targets interfere with each other based on the three-dimensional models M stored in advance in the storage 51. Specifically, the controller 50 determines whether or not the interference determination targets including the hands (14 and 24) interfere with each other excluding interference between the first horizontal link 11 of the first robot arm 10 and the first horizontal link 21 of the second robot arm 20. In the first embodiment, the controller 50 also determines whether or not the interference determination targets including the housing 40 interfere with each other. Furthermore, the controller 50 determines whether or not the interference determination targets including the object 60 arranged around the first robot arm 10 and the second robot arm 20 interfere with each other.

Targets of Interference Determination

Portions that are subject to interference determination are now described with reference to FIG. 4. In FIG. 4, portions that are subject to interference determination are represented by "○", and portions that are not subject to interference determination are represented by "x".

As shown in FIG. 4, targets of interference determination for the first horizontal link 11 of the first robot arm 10 are the hand 14 on its own side, the second horizontal link 22, the vertical link 23, and the hand 24 of the second robot arm 20 on the other side, and the object 60 arranged around the first robot arm 10 and the second robot arm 20. That is, it is not determined whether or not the first horizontal link 11 of the first robot arm 10 and the first horizontal link 21 of the second robot arm 20 interfere with each other.

Targets of interference determination for the second horizontal link 12 of the first robot arm 10 are the hand 14 on its own side, the first horizontal link 21, the second horizontal link 22, the vertical link 23, and the hand 24 of the second robot arm 20 on the other side, and the object 60 arranged around the first robot arm 10 and the second robot arm 20.

Targets of interference determination for the vertical link 13 of the first robot arm 10 are the hand 14 on its own side, the first horizontal link 21, the second horizontal link 22, the vertical link 23, and the hand 24 of the second robot arm 20 of the other side, and the object 60 arranged around the first robot arm 10 and the second robot arm 20.

Targets of interference determination for the hand 14 of the first robot arm 10 are the first horizontal link 21, the second horizontal link 22, the vertical link 23, and the hand 24 of the second robot arm 20 on the other side. Furthermore, in the first embodiment, it is determined whether or not the hand 14, the body 30, the housing 40, and the objects 60 arranged around the first robot arm 10 and the second robot arm 20 interfere with each other in the first robot arm 10.

Targets of interference determination for the first horizontal link 21, the second horizontal link 22, the vertical link 23, and the hand 24 of the second robot arm 20 are similar to those for the first robot arm 10.

In the first embodiment, as shown in FIG. 1, the controller 50 is provided in common for the first robot arm 10 and the second robot arm 20. The controller 50 determines whether or not the three-dimensional models M respectively generated for the first robot arm 10 and the second robot arm 20 overlap each other on three-dimensional coordinates. When the three-dimensional models M overlap each other, it is determined that the interference determination targets interfere with each other. The controller 50 determines whether or not the interference determination targets interfere with each other, and also controls the operations of the first robot arm 10 and the second robot arm 20.

Example of Interference Determination

Figure 5:
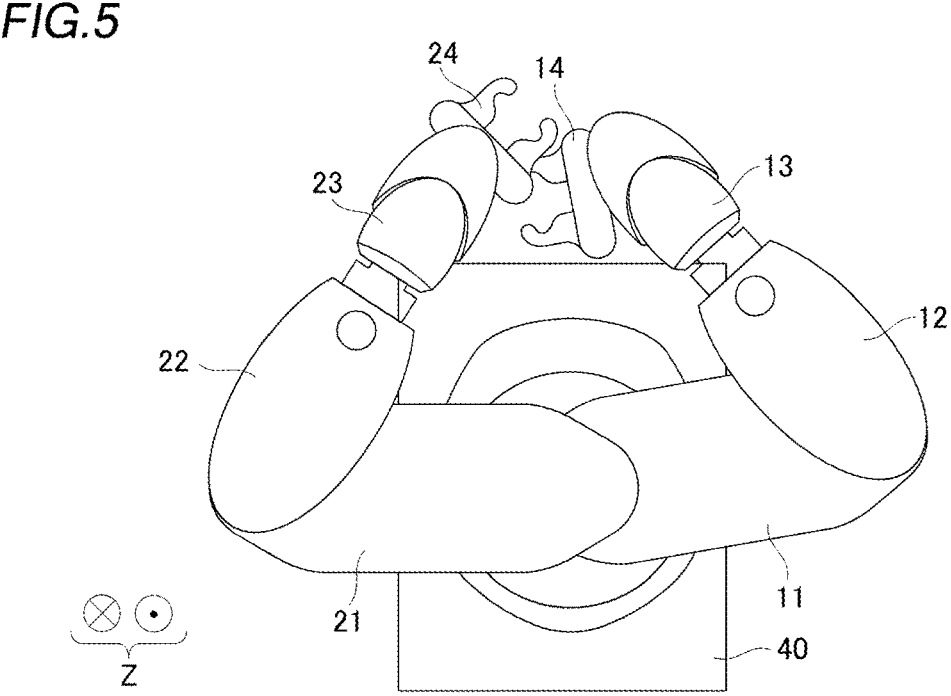
FIG. 5 is a diagram (1) for illustrating determination of interference in the dual-arm robot system according to the first embodiment.
Figure 6:
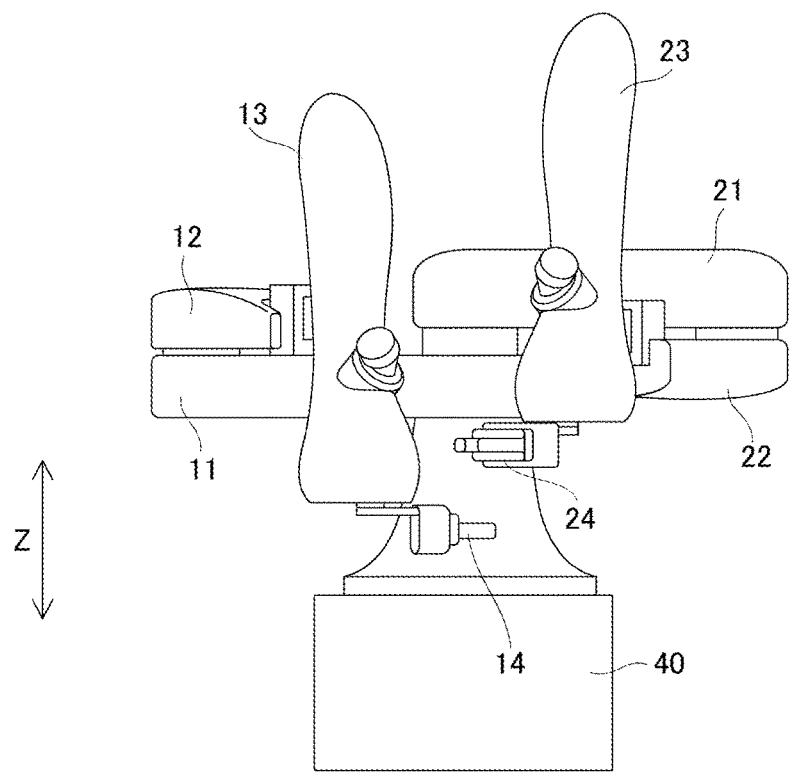
FIG. 6 is a diagram (2) for illustrating determination of interference in the dual-arm robot system according to the first embodiment.

As shown in FIGS. 5 and 6, when the hands 14 and 24 overlap each other as viewed from above but the heights of the hands 14 and 24 are different from each other, the hand 14 and the hand 24 two-dimensionally overlap each other when two-dimensional models are set for the hand 14 and the hand 24, and thus it is erroneously determined that the hand 14 and the hand 24 interfere with each other. Therefore, the three-dimensional models M1d and M2d are set for the hand 14 and the hand 24, respectively, as in the first embodiment such that erroneous determination can be reduced or prevented.

Figure 7:
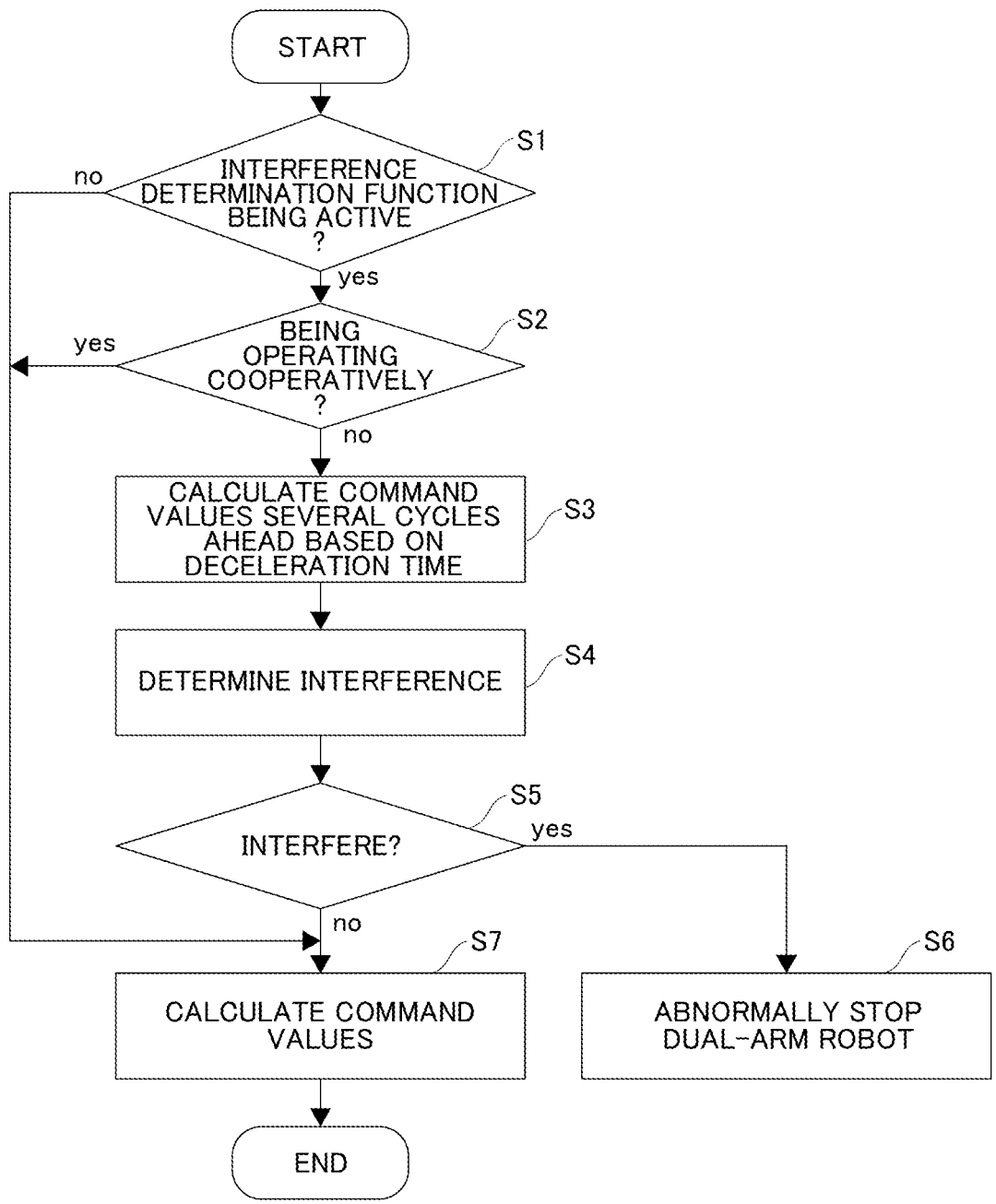
FIG. 7 is a control flowchart of the dual-arm robot system according to the first embodiment.
Figure 8:
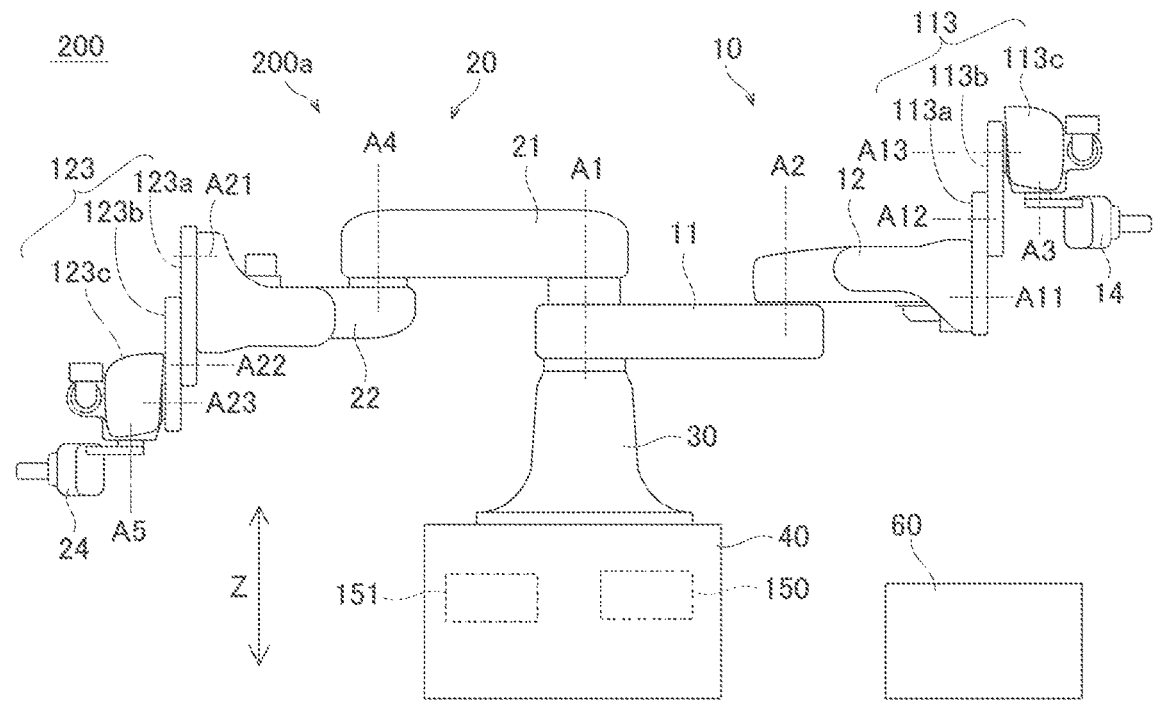
FIG. 8 is a side view of a dual-arm robot system according to a second embodiment.

The operation of the controller 50 is now described with reference to FIG. 7.

In step S1, the controller 50 determines whether or not an interference determination function provided in advance in the dual-arm robot system 100 is active. In a case of YES in step S1, the process advances to step S2.

In step S2, the controller 50 determines whether or not the first robot arm 10 and the second robot arm 20 are operating cooperatively. The cooperative operation refers to an operation in which one of the first robot arm 10 and the second robot arm 20 is set as a master, and the other is set as a slave. In the cooperative operation, the slave follows movement of the master. An example of the cooperative operation is an operation for moving one workpiece while holding it with the hand 14 of the first robot arm 10 and the hand 24 of the second robot arm 20. In a case of NO in step S2, the process advances to step S3.

In step S3, the controller 50 calculates command values for the dual-arm robot 100a several cycles ahead (command values for the servomotors) based on the deceleration time corresponding to the time required for the dual-arm robot 100a to decelerate and stop, which is obtained based on the current operation plan of the dual-arm robot 100a.

In step S4, the controller 50 determines whether or not the interference determination targets interfere with each other based on the calculated command values. That is, a position to which the dual-arm robot 100a moves until it decelerates and stops is calculated, and it is determined whether or not the three-dimensional models M of the interference determination targets overlap each other at the calculated position. Then, the process advances to step S5.

In a case of YES (the three-dimensional models M overlap each other) in step S5, the controller 50 abnormally stops the dual-arm robot 100a in step S6.

In a case of NO in step S5, the controller 50 calculates command values for the servomotors of the dual-arm robot 100a (command values for the next processing cycle) in step S7. In a case of NO in step S1 and in a case of YES in step S2, the controller 50 calculates command values for the servomotors of the dual-arm robot 100a in step S7.

The process operations in step S1 to step S7 are constantly performed during the operation of the dual-arm robot 100a.

Advantages of First Embodiment

According to the first embodiment, the following advantages are achieved.

According to the first embodiment, as described above, the controller 50 is configured or programmed to determine whether or not the interference determination targets interfere with each other based on whether or not the three-dimensional models M generated with the plurality of portions including at least the hands (14 and 24) among the hands (14 and 24), the horizontal links (11, 12, 21, and 22), and the body 30 as the interference determination targets overlap each other. Accordingly, mutual interference between the interference determination targets including at least the hands (14 and 24) is determined, and thus operations that cause the hands (14 and 24) and other portions to interfere with each other can be reduced or prevented. Consequently, interference between the hands (14 and 24) and other portions can be reduced or prevented.

According to the first embodiment, as described above, the body 30 supports the first robot arm 10 and the second robot arm 20 such that the first robot arm 10 and the second robot arm 20 coaxially rotate. When the first robot arm 10 and the second robot arm 20 rotate about different axes, the first robot arm 10 and the second robot arm 20 need to be spaced apart from each other. Therefore, the size of the dual-arm robot system 100 is increased. On the other hand, in the dual-arm robot system 100 according to the first embodiment, the first robot arm 10 and the second robot arm 20 coaxially rotate, and thus the first robot arm 10 and the second robot arm 20 can be arranged with a small distance therebetween. Thus, the size of the dual-arm robot system 100 can be decreased.

According to the first embodiment, as described above, the horizontal links (11, 12, 21, and 22) of the first robot arm 10 and the second robot arm 20 include the first horizontal links (11 and 21) rotatably connected to the body 30, and the second horizontal links (12 and 22) rotatably connected to the first horizontal links (11 and 21). The controller 50 is configured or programmed to determine whether or not the interference determination targets including the hands (14 and 24) interfere with each other excluding interference between the first horizontal link 11 of the first robot arm 10 and the first horizontal link 21 of the second robot arm 20. The first horizontal link 11 of the first robot arm 10 and the first horizontal link 21 of the second robot arm 20 coaxially rotate, and thus the first horizontal link 11 of the first robot arm 10 and the first horizontal link 21 of the second robot arm 20 do not interfere with each other. Therefore, as described above, the controller 50 determines whether or not the interference determination targets including the hands (14 and 24) interfere with each other excluding interference between the first horizontal link 11 of the first robot arm 10 and the first horizontal link 21 of the second robot arm 20 such that it is not determined whether or not the first horizontal link 11 of the first robot arm 10 and the first horizontal link 21 of the second robot arm 20 interfere with each other, and thus the control load on the controller 50 can be reduced.

According to the first embodiment, as described above, the controller 50 is configured or programmed to determine whether or not the hand (14 or 24) and the body 30 interfere with each other in each of the first robot arm 10 and the second robot arm 20. Accordingly, mutual interference between the hands (14 and 24) and the body 30 with movement of the hands (14 and 24) can be easily reduced or prevented.

According to the first embodiment, as described above, the controller 50 is configured or programmed to determine whether or not the interference determination targets interfere with each other based on the three-dimensional models M stored in advance in the storage 51. Accordingly, interference can be easily determined based on the three-dimensional models M stored in advance in the storage 51.

According to the first embodiment, as described above, the three-dimensional models M of the horizontal links (11, 12, 21, and 22) and the body 30 are set based on the coordinate system of the body 30, and the three-dimensional models M of the hands (14 and 24) are set based on the tip end coordinates of the hands (14 and 24). Accordingly, the horizontal links (11, 12, 21, and 22) and the body 30 do not change in shape and size, and thus the three-dimensional models M of the horizontal links (11, 12, 21, and 22) and the body 30 can be easily set based on the coordinate system of the body 30. Furthermore, the shapes and sizes of the hands (14 and 24) may change depending on the operations of the hands (14 and 24), and thus the three-dimensional models M of the hands (14 and 24) can be appropriately set based on the tip end coordinates of the hands (14 and 24).

According to the first embodiment, as described above, the controller 50 is configured or programmed to determine whether or not the interference determination targets including the housing 40 interfere with each other. Accordingly, when the body 30 is placed on the housing 40, interference between at least the hands (14 and 24) and the housing 40 can be reduced or prevented.

According to the first embodiment, as described above, the first cables 71 are provided inside the housing 40 and the body 30 to connect the controller 50 arranged inside the housing 40 to the first robot arm 10 and the second robot arm 20. Accordingly, unlike a case in which the first cables 71 are provided outside the housing 40 and the body 30, interference of the first cables 71 with the surrounding object 60, for example, can be reduced or prevented.

According to the first embodiment, as described above, the controller 50 is configured or programmed to determine whether or not the interference determination targets including the object 60 arranged around the first robot arm 10 and the second robot arm 20 interfere with each other. Accordingly, when the object 60 is arranged around the first robot arm 10 and the second robot arm 20, interference between at least the hands (14 and 24) and the object 60 arranged around the first robot arm 10 and the second robot arm 20 can be reduced or prevented.

According to the first embodiment, as described above, the controller 50 is provided in common for the first robot arm 10 and the second robot arm 20. Accordingly, the configuration of the dual-arm robot system 100 can be simplified (downsized) as compared with a case in which the controller 50 is provided individually for each of the first robot arm 10 and the second robot arm 20. Furthermore, the controller 50 is provided in common for the first robot arm 10 and the second robot arm 20, and thus the dual-arm robot system 100 can be space-saving, low-cost, and easy to operate. Moreover, unlike a case in which controllers 50 provided separately for the first robot arm 10 and the second robot arm 20 determine interference while communicating with each other, interference can be accurately determined while a delay in determination is reduced or prevented.

According to the first embodiment, as described above, the controller 50 is configured or programmed to control the operations of the first robot arm 10 and the second robot arm 20 in addition to determining whether or not the interference determination targets interfere with each other. Accordingly, unlike a case in which separate controllers 50 control the operations of the first robot arm 10 and the second robot arm 20, delays in operations for avoiding interference can be reduced or prevented.

Second Embodiment

The configuration of a dual-arm robot system 200 according to a second embodiment is now described with reference to FIGS. 8 to 17.

In the second embodiment, the dual-arm robot system 200 includes a vertical link 113 in a first robot arm 10. The vertical link 113 includes plate-shaped members 113a and 113b provided at the tip end of the first robot arm 10. Moreover, a hand attachment member 113c to which a hand 14 is attached is provided on the plate-shaped members 113a and 113b. The vertical link 113 rotates the plate-shaped members 113a and 113b about predetermined axes to move the hand attachment member 113c up and down so as to move the hand 14 in a vertical direction. Specifically, the plate-shaped member 113a rotates about an axis A11 with respect to a second horizontal link 12. The plate-shaped member 113b rotates about an axis A12 with respect to the plate-shaped member 113a. Each of the plate-shaped member 113a and the plate-shaped member 113b has a substantially elliptical shape.

A second robot arm 20 includes a vertical link 123. The vertical link 123 has the same or similar configuration as that of the vertical link 113. That is, the vertical link 123 includes plate-shaped members 123a and 123b, and a hand attachment member 123c.

In a dual-arm robot 200a, a first end of a first horizontal link 11 rotates about an A1 axis. A second end of the first horizontal link 11 (a first end of the second horizontal link 12) rotates about an A2 axis. A first end of the plate-shaped member 113a rotates about the A11 axis. A second end of the plate-shaped member 113a (a first end of the plate-shaped member 113b) rotates about the A12 axis. A second end (hand attachment member 113c) of the plate-shaped member 113b rotates about an A13 axis. The hand 14 rotates about an A3 axis. The A11 axis, the A12 axis, and the A13 axis are horizontal axes, and are arranged parallel to each other.

In the dual-arm robot 200a, a first end of a first horizontal link 21 rotates about the A1 axis. A second end of the first horizontal link 21 (a first end of a second horizontal link 22) rotates about an A4 axis. A first end of the plate-shaped member 123a rotates about an A21 axis. A second end of the plate-shaped member 123a (a first end of the plate-shaped member 123b) rotates about an A22 axis. A second end (hand attachment member 123c) of the plate-shaped member 123b rotates about an A23 axis. A hand 24 rotates about an A5 axis. The A21 axis, the A22 axis, and the A23 axis are horizontal axes, and are arranged parallel to each other.

In a storage 151, three-dimensional models M of the hand 14, the hand 24, the first horizontal link 11, the second horizontal link 12, the first horizontal link 21, the second horizontal link 22, and a body 30 are stored in advance. Furthermore, a three-dimensional model M of a housing 40 is stored in advance in the storage 151. Moreover, three-dimensional models M of the vertical link 113 (the plate-shaped member 113a, the plate-shaped member 113b, and the hand attachment member 113c) and the vertical link 123 (he plate-shaped member 123a, the plate-shaped member 123b, and the hand attachment member 123c) are stored in advance in the storage 151.

In the second embodiment, as shown in FIGS. 9 to 12, the three-dimensional model M of the vertical link 113 is set based on a radius r1 (r2) about the predetermined axis A11 (A12) about which the plate-shaped member 113a (113b) rotates, the length L1 (L2) of the plate-shaped member 113a (113b), and the thickness t1 (t2) of the plate-shaped member 113a (113b). Specifically, the arcuate shape of the substantially elliptical plate-shaped member 113a is defined based on the radius r1 about the axis A11. Then, a three-dimensional model M10a of the plate-shaped member 113a is generated based on the radius r1, the length L1, and the thickness t1. Similarly, a three-dimensional model M10b of the plate-shaped member 113b is generated based on the radius r2, the length L2, and the thickness t2. A three-dimensional model M10c of the hand attachment member 123c has a substantially elliptical shape (see FIG. 9) along the shape of the hand attachment member 123c, as viewed from above, for example. The Z-direction length of the three-dimensional model M10c of the hand attachment member 113c is a length corresponding to the Z-direction length of the hand attachment member 113c.

A three-dimensional model M11a of the plate-shaped member 123a, a three-dimensional model M11b of the plate-shaped member 123b, and a three-dimensional model M11c of the hand mounting member 123c of the vertical link 123 of the second robot arm 20 are set similarly.

Figure 9:
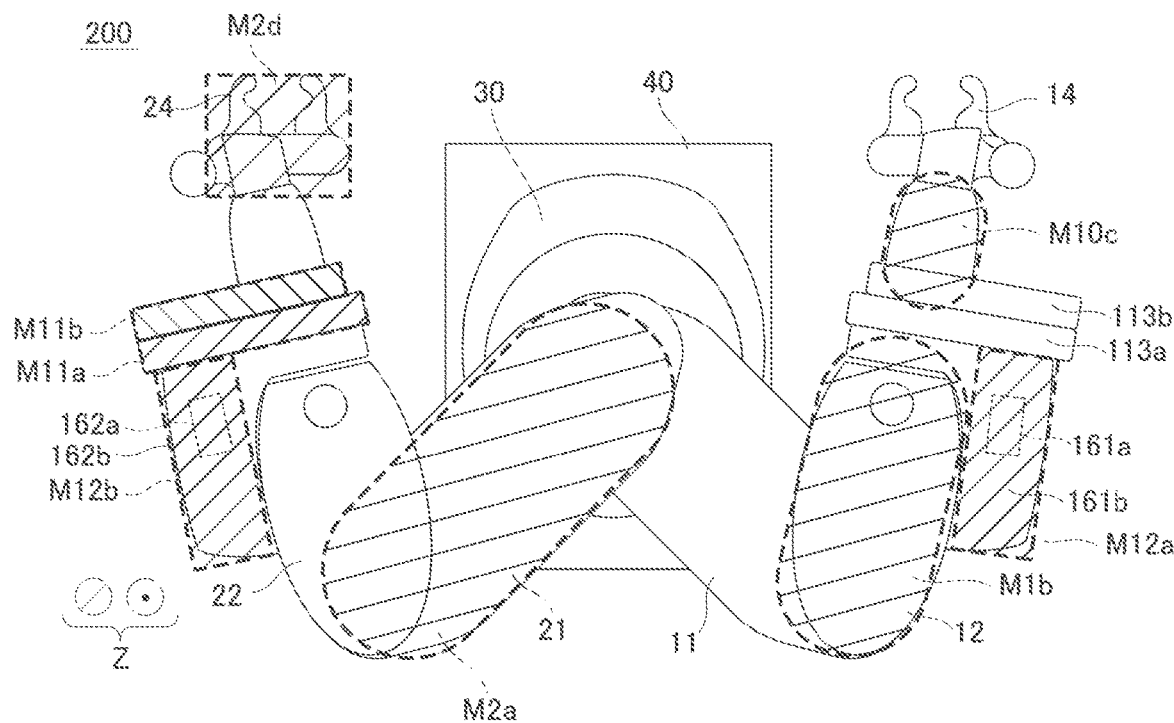
FIG. 9 is a top view of the dual-arm robot system according to the second embodiment.
Figure 10:
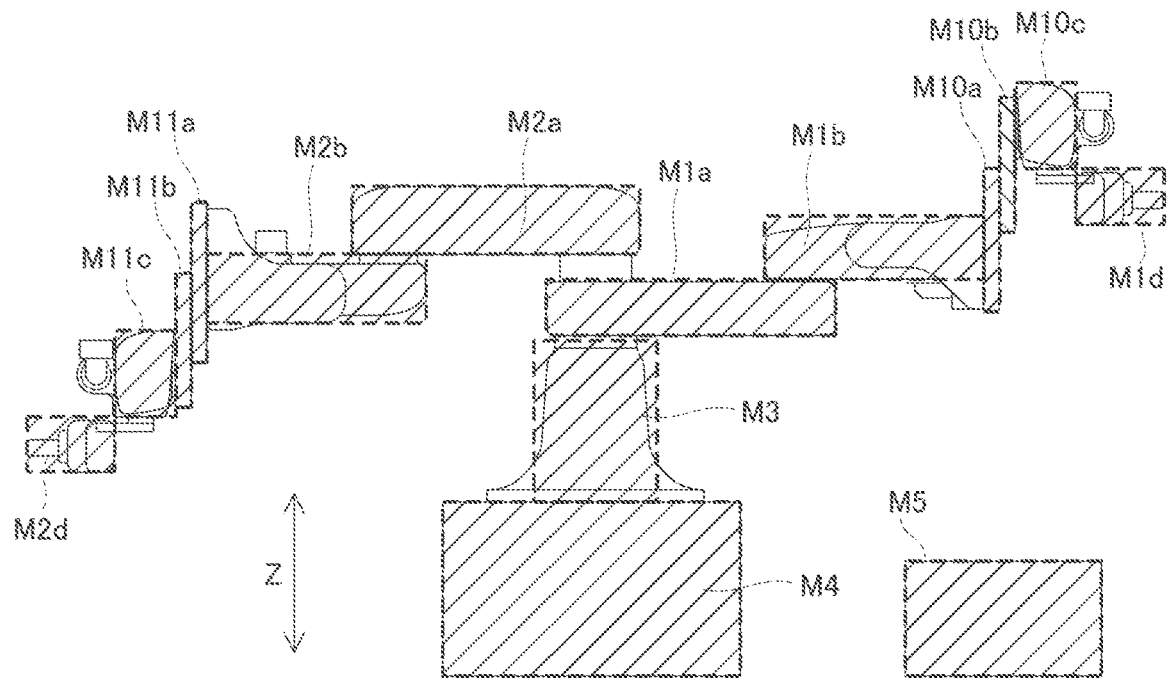
FIG. 10 is a diagram (1) showing three-dimensional models of the dual-arm robot system according to the second embodiment.
Figure 11:
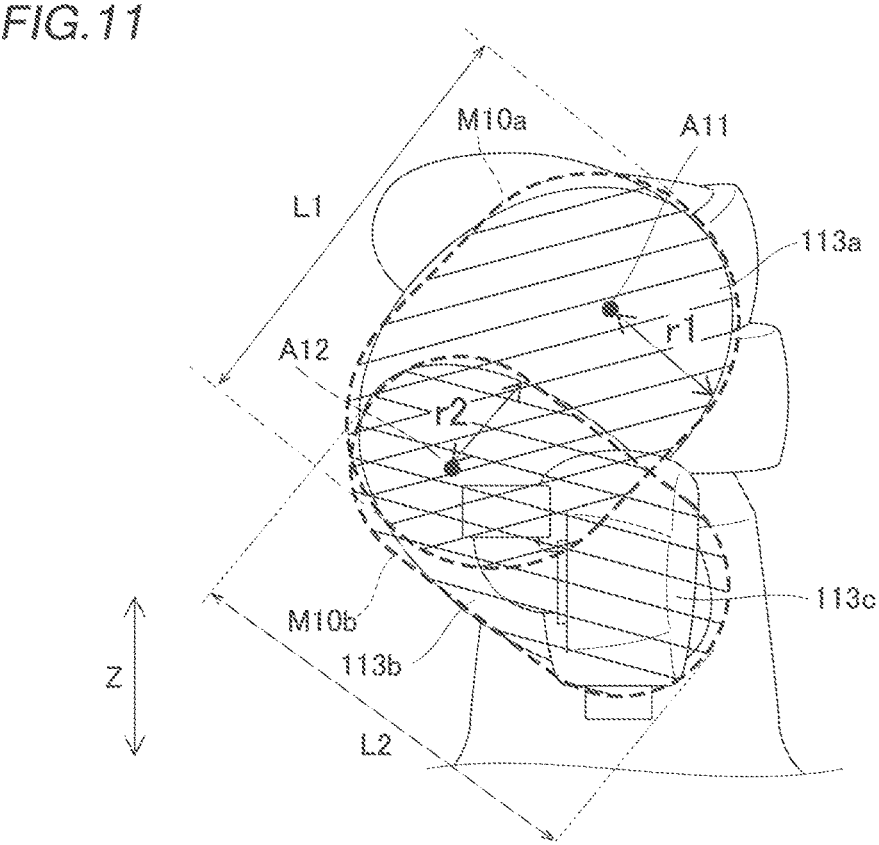
FIG. 11 is a diagram (2) showing the three-dimensional models of the dual-arm robot system according to the second embodiment.
Figure 12:
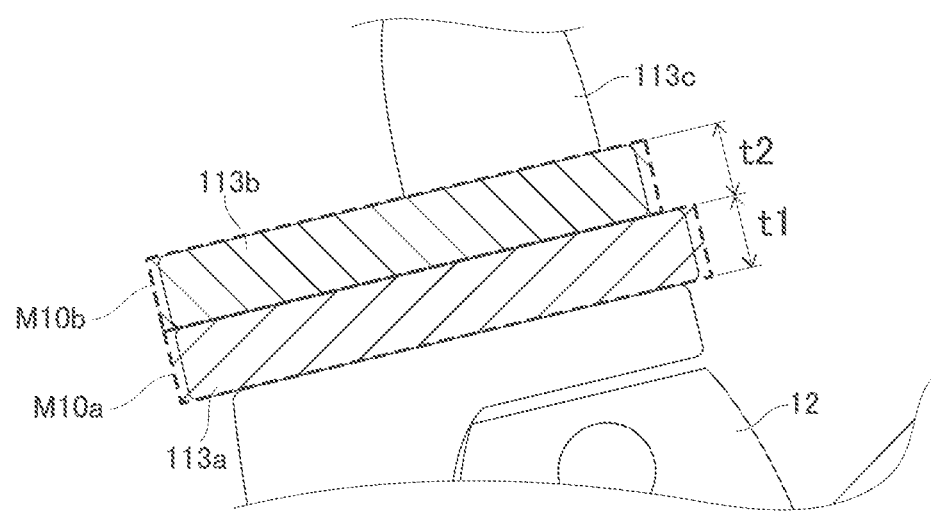
FIG. 12 is a diagram (3) showing the three-dimensional models of the dual-arm robot system according to the second embodiment.

In the second embodiment, as shown in FIG. 9, a cover 161b is provided to cover a drive 161a that rotates the plate-shaped members 113a and 113b of the first robot arm 10. The cover 161b is attached to the vertical link 113. A three-dimensional model M12a of the cover 161b is set separately from the three-dimensional model M of the vertical link 113. The three-dimensional model M12a of the cover 161b has vertical and horizontal lengths set with respect to the rotation axis (A2) of the second horizontal link 12. The three-dimensional model M12a of the cover 161b has a substantially rectangular shape along the shape of the cover 161b, as viewed from above, for example. The Z-direction length of the three-dimensional model M12a of the cover 161b is a length corresponding to the Z-direction length of the cover 161b.

A three-dimensional model M12b of a cover 162b covering a drive 162a that rotates the plate-shaped members 123a and 123b of the second robot arm 20 is set similarly.

Targets of Interference Determination

As shown in FIG. 13, targets of interference determination for the first horizontal link 11 of the first robot arm 10 by the controller 150 (see FIG. 8) are the hand 14 on its own side, the second horizontal link 22, the hand attachment member 123c, the hand 24, the cover 162b, the plate-shaped member 123a, and the plate-shaped member 123b of the second robot arm 20 on the other side, and an object 60 arranged around the first robot arm 10 and the second robot arm 20. In FIG. 13, the plate-shaped member 123a is described as a plate-shaped member A, and the plate-shaped member 123b is described as a plate-shaped member B.

Targets of interference determination for the second horizontal link 12 of the first robot arm 10 are the hand 14 on its own side, the first horizontal link 21, the second horizontal link 22, the hand attachment member 123c, and the hand 24, the cover 162b, the plate-shaped member 123a, and the plate-shaped member 123b of the second robot arm 20 on the other side, and the object 60 arranged around the first robot arm 10 and the second robot arm 20.

Targets of interference determination for the hand attachment member 113c of the first robot arm 10 are the hand 14 on its own side, the first horizontal link 21, the second horizontal link 22, the hand attachment member 123c, the hand 24, the cover 162b, the plate-shaped member 123a, and the plate-shaped member 123b of the second robot arm 20 on the other side, and the object 60 arranged around the first robot arm 10 and the second robot arm 20.

Targets of interference determination for the cover 161b of the first robot arm 10 are the hand 14 on its own side, the first horizontal link 21, the second horizontal link 22, the hand attachment member 123c, the hand 24, the cover 162b, the plate-shaped member 123a, and the plate-shaped member 123b of the second robot arm 20 on the other side, and the object 60 arranged round the first robot arm 10 and the second robot arm 20.

Targets of interference determination for the plate-shaped member 113a of the first robot arm 10 are the hand 14 on its own side, the first horizontal link 21, the second horizontal link 22, the hand attachment member 123c, the hand 24, the cover 162b, the plate-shaped member 123a, and the plate-shaped member 123b of the second robot arm 20 on the other side, and the object 60 arranged around the first robot arm 10 and the second robot arm 20. In FIG. 13, the plate-shaped member 113a is described as a plate-shaped member A.

Targets of interference determination for the plate-shaped member 113b of the first robot arm 10 are the hand 14 on its own side, the first horizontal link 21, the second horizontal link 22, the hand attachment member 123c, the hand 24, the cover 162b, the plate-shaped member 123a, and the plate-shaped member 123b of the second robot arm 20 on the other side, and the object 60 arranged around the first robot arm 10 and the second robot arm 20. In FIG. 13, the plate-shaped member 113b is described as a plate-shaped member B.

Targets of interference determination for the hand 14 of the first robot arm 10 are the first horizontal link 21, the second horizontal link 22, the hand attachment member 123c, the hand 24, the cover 162b, the plate-shaped member 123a, and the plate-shaped member 123b of the second robot arm 20 on the other side, the body 30, the housing 40, and the object 60 arranged around the first robot arm 10 and the second robot arm 20.

Targets of interference determination for the first horizontal link 21, the second horizontal link 22, the hand attachment member 123c, the cover 162b, the plate-shaped member 123a, the plate-shaped member 123b, and the hand 24 of the second robot arm 20 are similar to those for the first robot arm 10.

Example of Interference Determination

Figure 14:
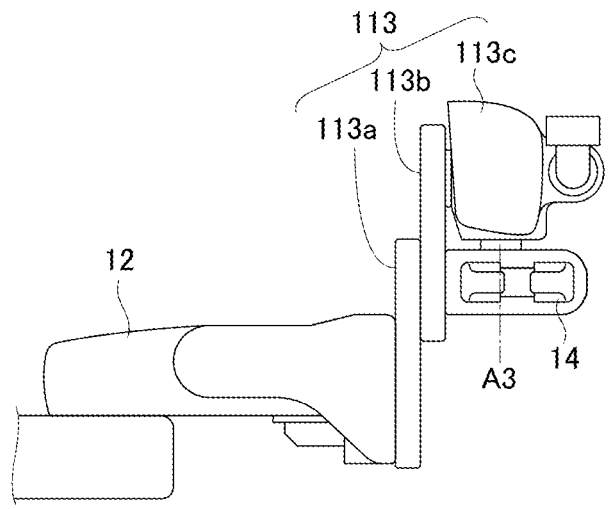
FIG. 14 is a diagram (1) for illustrating determination of interference in the dual-arm robot system according to the second embodiment.

As shown in FIG. 14, it is determined whether or not the hand 14 and the vertical link 113 (the plate-shaped member 113a, the plate-shaped member 113b, and the hand attachment member 113c) interfere with each other, and thus interference between the hand 14 and the vertical link 113 can be reduced or prevented.

Figure 15:
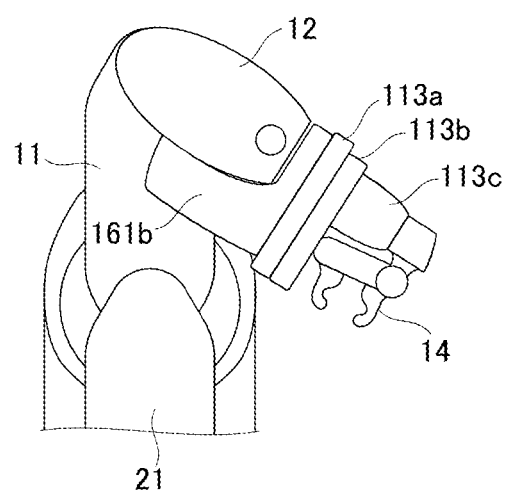
FIG. 15 is a diagram (2) for illustrating determination of interference in the dual-arm robot system according to the second embodiment.

As shown in FIG. 15, the size of the three-dimensional model M12a of the cover 161b is appropriately set such that erroneous determination that the cover 161b and the first horizontal link 21 interfere with each other can be reduced or prevented.

Figure 16:
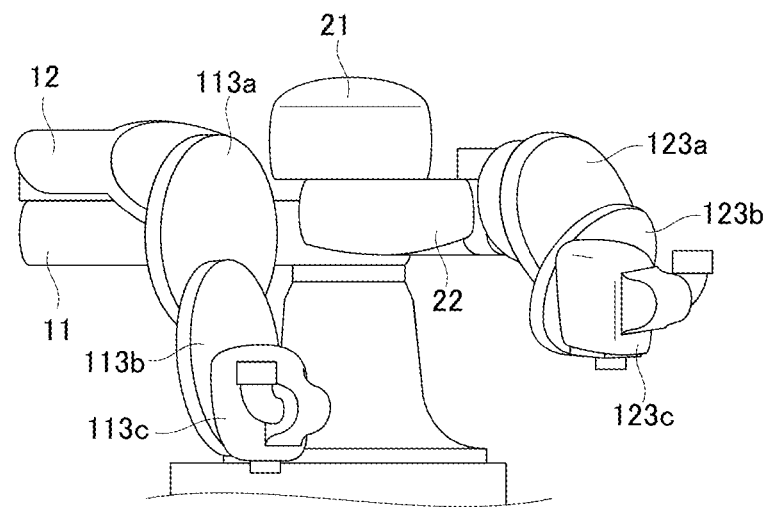
FIG. 16 is a diagram (3) for illustrating determination of interference in the dual-arm robot system according to the second embodiment.

As shown in FIG. 16, it is determined whether or not the plate-shaped member 113a of the first robot arm 10 and the first horizontal link 21 of the second robot arm 20 interfere with each other, and thus interference between the plate-shaped member 113a of the first robot arm 10 and the first horizontal link 21 of the second robot arm 20 can be reduced or prevented.

Figure 17:
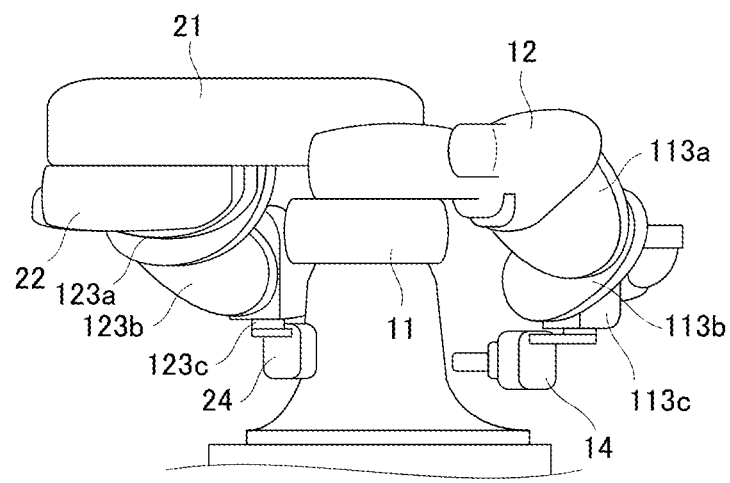
FIG. 17 is a diagram (4) for illustrating determination of interference in the dual-arm robot system according to the second embodiment.

As shown in FIG. 17, the three-dimensional model M3 of the body 30 is set such that interference between the body 30 and the hands 14 and 24 can be reduced or prevented.

Advantages of Second Embodiment

According to the second embodiment, the following advantages are achieved.

According to the second embodiment, as described above, the controller 150 is configured or programmed to determine whether or not the interference determination targets including the vertical links (113 and 123) interfere with each other. Accordingly, interference can be easily determined based on the three-dimensional model M stored in advance in the storage 151.

According to the second embodiment, as described above, each of the plate-shaped members (113a, 113b, 123a, and 123b) has a substantially elliptical shape, and the three-dimensional models M of the vertical links (113 and 123) are set based on the radii (r1 and r2) about the predetermined axes (A11, A12, A22, and A23), the lengths (L1 and L2) of the plate-shaped members, and the thicknesses (t1 and t2) of the plate-shaped members. Accordingly, the three-dimensional models M of the plate-shaped members can be set appropriately by the radii (the arcuate shapes of the substantially elliptical plate-shaped members) about the predetermined axes, the lengths of the plate-shaped members, and the thicknesses of the plate-shaped members.

According to the second embodiment, as described above, the controller 50 is configured or programmed to determine whether or not the interference determination targets including the covers (161b and 162b) interfere with each other. Accordingly, even when the covers (161b and 162b) are provided to cover the drives (161a and 162a), it can be appropriately determined that the interference determination targets interfere with each other.

According to the second embodiment, as described above, the covers (161b and 162b) are attached to the vertical links (113 and 123), and the three-dimensional models M of the covers (161b and 162b) are set separately from the three-dimensional models M of the vertical links (113 and 123), and have vertical and horizontal lengths set with respect to the rotation axes (A2 and A4) of the horizontal links (12 and 22). Accordingly, unlike a case in which the covers (161b and 162b) and the vertical links (113 and 123) to which the covers (161b and 162b) are attached are represented by one relatively large three-dimensional model M, it can be appropriately determined whether or not the covers (161b and 162b) interfere with other portions.

Third Embodiment

Figure 18:
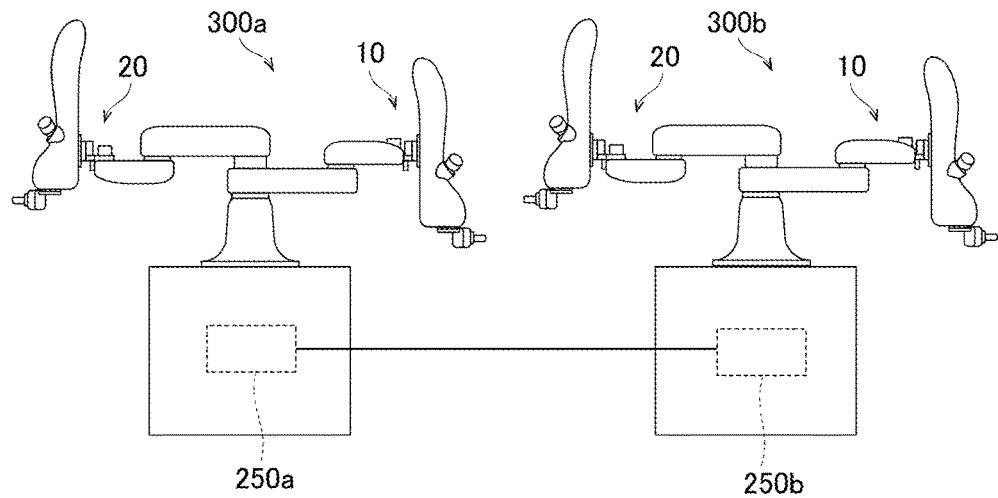
FIG. 18 is a side view of a dual-arm robot system according to a third embodiment.

The configuration of a dual-arm robot system 300 according to a third embodiment is now described with reference to FIG. 18.

The dual-arm robot system 300 comprises a first dual-arm robot 300a and a second dual-arm robot 300b each including a first robot arm 10 and a second robot arm 20. The configurations of the first dual-arm robot 300a and the second dual-arm robot 300b are similar to that of the dual-arm robot 100a according to the first embodiment (or the dual-arm robot 200a according to the second embodiment).

A controller 250a and a controller 250b are provided to control the first dual-arm robot 300a and to control the second dual-arm robot 300b, respectively. Various information (such as three-dimensional models of hands, command values for the next processing cycle, and command values several cycles ahead) is communicated (Ethernet, for example) between the controller 250a and the controller 250b such that a control for interference avoidance is performed. The controller 250a and the controller 250b may be configured by one controller.

The controller 250a determines whether or not interference determination targets interfere with each other in the first dual-arm robot 300a (see FIG. 4 of the first embodiment, for example). The controller 250b determines whether or not interference determination targets interfere with each other in the second dual-arm robot 300b (see FIG. 4 of the first embodiment, for example). Furthermore, the controller 250a and the controller 250b determine whether or not the interference determination targets of the first dual-arm robot 300a and the interference determination targets of the second dual-arm robot 300b interfere with each other.

Advantages of Third Embodiment

According to the third embodiment, the following advantages are achieved.

According to the third embodiment, as described above, the controller 250a is configured or programmed to determine whether or not the interference determination targets interfere with each other in the first dual-arm robot 300a, the controller 250b is configured or programmed to determine whether or not the interference determination targets interfere with each other in the second dual-arm robot 300*b*, and the controller 250*a* and the controller 250*b* are configured or programmed to determine whether or not the interference determination targets of the first dual-arm robot 300*a* and the interference determination targets of the second dual-arm robot 300*b* interfere with each other. Accordingly, even when the first dual-arm robot 300*a* and the second dual-arm robot 300*b* are provided, not only interference within the first dual-arm robot 300*a* itself (the second dual-arm robot 300*b* itself) but also interference with another dual-arm robot can be reduced or prevented.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the hands (14 and 24), all of the horizontal links (11, 12, 21, and 22), the vertical links (13 and 23) (or the vertical links (113 and 123)), the body 30, the housing 40, the surrounding object 60, and the covers (161*b* and 162*b*) (only in the second embodiment) are applied as the interference determination targets has been shown in each of the aforementioned first to third embodiments, the present disclosure is not limited to this. For example, in the present disclosure, all of the above may not be the interference determination targets.

While the example in which the first end of the first horizontal link 11 of the first robot arm 10 and the first end of the first horizontal link 21 of the second robot arm 20 rotate coaxially has been shown in each of the aforementioned first to third embodiments, the present disclosure is not limited to this. For example, the first end of the first horizontal link 11 of the first robot arm 10 and the first end of the first horizontal link 21 of the second robot arm 20 may rotate about different axes. In this case, interference between the first horizontal link 11 of the first robot arm 10 and the first horizontal link 21 of the second robot arm 20 is also determined.

While the example in which the first robot arm 10 and the second robot arm 20 include the vertical links (13 and 23) or the vertical links (113 and 123) has been shown in each of the aforementioned first to third embodiments, the present disclosure is not limited to this. For example, the first robot arm 10 and the second robot arm 20 may not include the vertical links.

While the example in which the controller 50 (or the controller 150 or the controller 250) is provided in common for the first robot arm 10 and the second robot arm 20 has been shown in each of the aforementioned first to third embodiments, the present disclosure is not limited to this. For example, the controller 50 (or the controller 150 or the controller 250) may be provided individually for each of the first robot arm 10 and the second robot arm 20.

Figure 19:
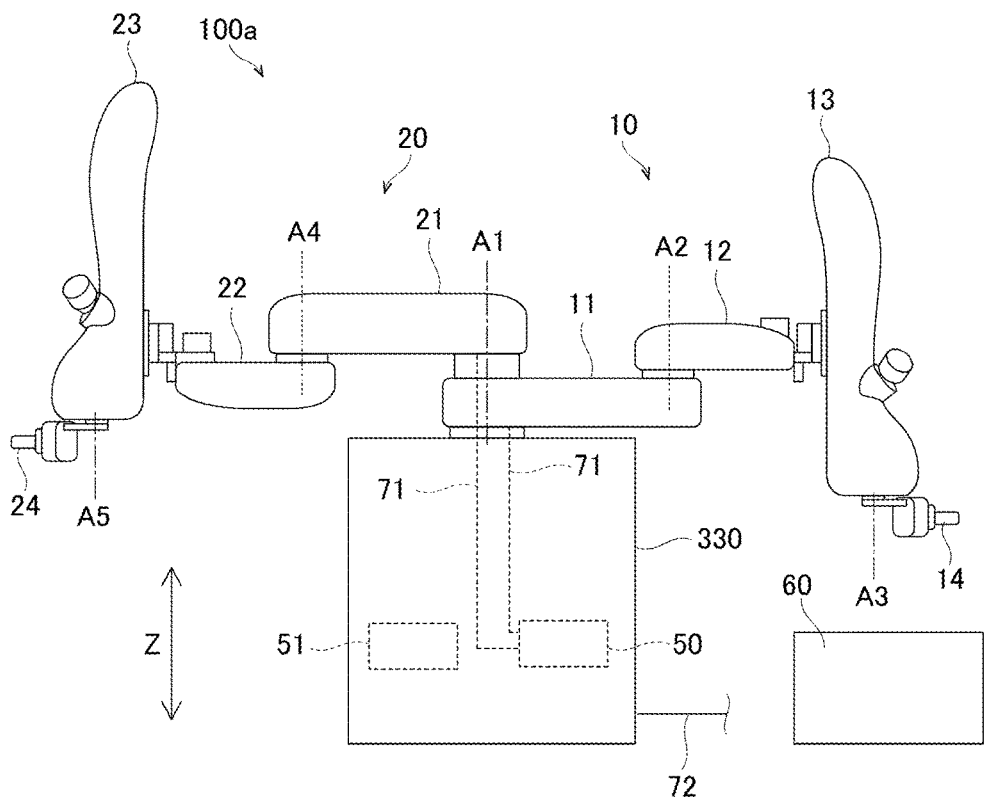
FIG. 19 is a side view of a dual-arm robot system according to a first modified example.

While the example in which the body 30 and the housing 40 are provided separately has been shown in each of the aforementioned first to third embodiments, the present disclosure is not limited to this. For example, as shown in FIG. 19, the body and the housing may be integral and unitary with each other (body 330) (that is, the controller 50 may be provided in the body 330).

Figure 20:
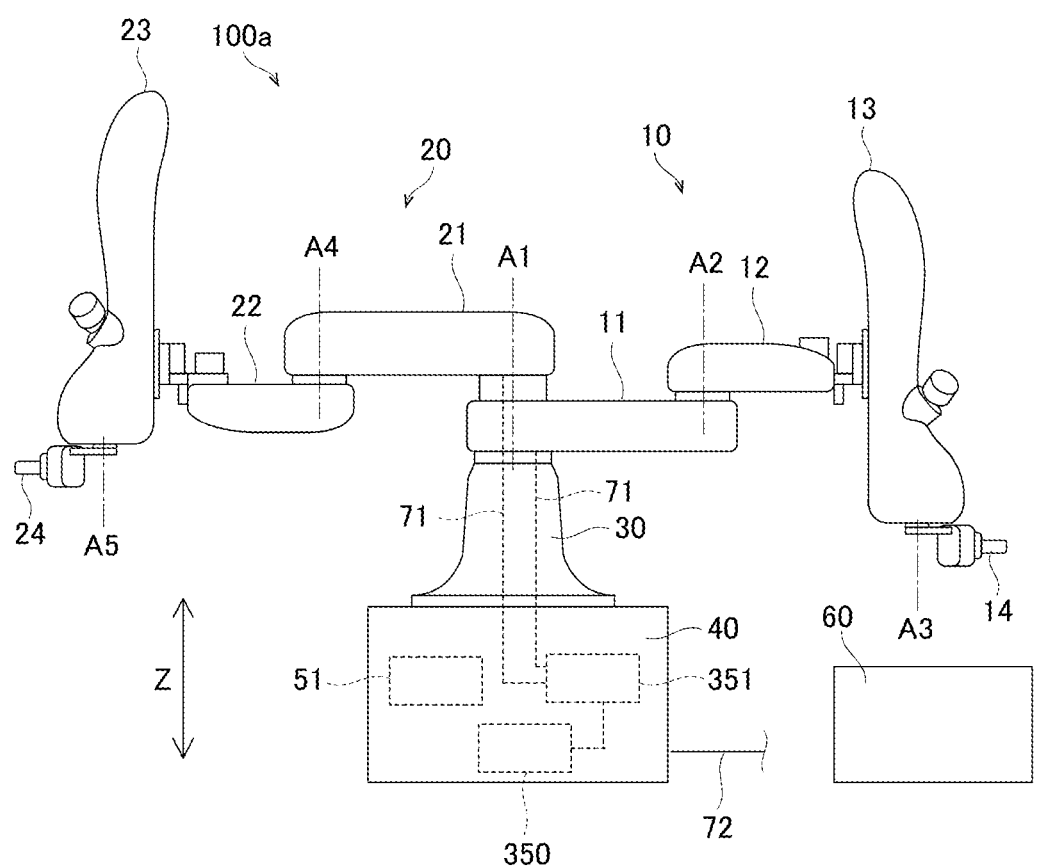
FIG. 20 is a side view of a dual-arm robot system according to a second modified example.

While the example in which the controller 50 controls the operations of the first robot arm 10 and the second robot arm 20 in addition to determination of interference has been shown in each of the aforementioned first to third embodiments, the present disclosure is not limited to this. For example, as shown in FIG. 20, a controller 350 that determines interference and an operation controller 351 that controls the operations of the first robot arm 10 and the second robot arm 20 may be provided separately.

DESCRIPTION OF REFERENCE NUMERALS

10: first robot arm
11, 21: first horizontal link (horizontal link)
12, 22: second horizontal link (horizontal link)
13, 23: vertical link (first vertical link)
14, 24: hand
20: second robot arm
30, 330: body
40: housing
50, 150, 250, 250*a*, 250*b*, 350: controller
51, 151: storage
60: object
71: first cable
72: second cable
100, 200, 300: dual-arm robot system
113, 123: vertical link (second vertical link)
113*a*, 123*a*: plate-shaped member
113*b*, 123*b*: plate-shaped member
113*c*, 123*c*: hand attachment member
161*a*, 162*a*: drive
161*b*, 162*b*: cover
300*a*: first dual-arm robot
300*b*: second dual-arm robot
351: operation controller
L1, L2: length
M, M1*a*, M1*b*, M1*c*, M1*d*, M2*a*, M2*b*, M2*c*, M2*d*, M3, M4, M5, M10*a*, M10*b*, M10*c*, M11*a*, M11*b*, M11*c*, M12*a*, M12*b*: three-dimensional model
r1, r2: radius
t1, t2: thickness

The invention claimed is:

1. A dual-arm robot system comprising:
a first robot arm and a second robot arm each including a horizontal link to which a hand is attached, the horizontal link being operable to rotate along a horizontal plane;
a body to support the first robot arm and the second robot arm such that the first robot arm and the second robot arm coaxially rotate;
a controller configured or programmed to determine whether or not interference determination targets interfere with each other based on whether or not three-dimensional models generated with a plurality of portions including at least the hand among the hand, the horizontal link, and the body as the interference determination targets overlap each other;
a vertical link including a plate-shaped member provided at a tip end of each of the first robot arm and the second robot arm, and a hand attachment member provided on the plate-shaped member and to which the hand is attached, the vertical link being operable to rotate the plate-shaped member about a predetermined axis to move the hand attachment member up and down so as to move the hand in a vertical direction; and
a storage to store in advance the three-dimensional models of the hand, the horizontal link, the plate-shaped member, the hand attachment member, and the body;
wherein:

the controller is configured or programmed to determine whether or not the interference determination targets including the vertical link interfere with each other, the plate-shaped member has a substantially elliptical shape, and the three-dimensional model of the vertical link is set based on a radius about the predetermined axis, a length of the plate-shaped member, and a thickness of the plate-shaped member.

2. The dual-arm robot system according to claim 1, wherein the horizontal link of each of the first robot arm and the second robot arm includes a first horizontal link rotatably connected to the body, and a second horizontal link rotatably connected to the first horizontal link; and the controller is configured or programmed to determine whether or not the interference determination targets including the hand interfere with each other excluding interference between the first horizontal link of the first robot arm and the first horizontal link of the second robot arm.

3. The dual-arm robot system according to claim 1, wherein the controller is configured or programmed to determine whether or not the hand and the body interfere with each other in each of the first robot arm and the second robot arm.

4. The dual-arm robot system according to claim 1, further comprising:

another vertical link provided on a tip end side of each of the first robot arm and the second robot arm, the another vertical link being operable to move along the vertical direction, wherein the storage stores in advance the three-dimensional models of the hand, the horizontal link, the body, and the another vertical link; and the controller is configured or programmed to determine whether or not the interference determination targets interfere with each other based on the three-dimensional models stored in advance in the storage.

5. The dual-arm robot system according to claim 1, wherein the three-dimensional models of the horizontal link and the body are set based on a coordinate system of the body; and the three-dimensional model of the hand is set based on tip end coordinates of the hand.

6. The dual-arm robot system according to claim 1, further comprising:

a housing on which the body is placed and in which the controller is arranged; wherein the controller is configured or programmed to determine whether or not the interference determination targets including the housing interfere with each other.

7. The dual-arm robot system according to claim 6, further comprising:

a first cable inside the housing and the body to connect the controller arranged inside the housing to the first robot arm and the second robot arm; and a second cable outside the housing and the body.

8. The dual-arm robot system according to claim 1, wherein the controller is configured or programmed to determine whether or not the interference determination targets including an object arranged around the first robot arm and the second robot arm interfere with each other.

9. The dual-arm robot system according to claim 1, wherein the controller is provided in common for the first robot arm and the second robot arm.

10. The dual-arm robot system according to claim 1, wherein the controller is configured or programmed to control operations of the first robot arm and the second robot arm in addition to determining whether or not the interference determination targets interfere with each other; or the dual-arm robot system further comprises an operation controller configured or programmed to control the operations of the first robot arm and the second robot arm, separately from the controller configured or programmed to determine whether or not the interference determination targets interfere with each other.

11. A dual-arm robot system comprising:

a first robot arm and a second robot arm each including a horizontal link to which a hand is attached, the horizontal link being operable to rotate along a horizontal plane;

a body to support the first robot arm and the second robot arm such that the first robot arm and the second robot arm coaxially rotate;

a controller configured or programmed to determine whether or not interference determination targets interfere with each other based on whether or not three-dimensional models generated with a plurality of portions including at least the hand among the hand, the horizontal link, and the body as the interference determination targets overlap each other;

a second link including a plate-shaped member provided at a tip end of each of the first robot arm and the second robot arm, and a hand attachment member provided on the plate-shaped member and to which the hand is attached, the vertical link being operable to rotate the plate-shaped member about a predetermined axis to move the hand attachment member up and down so as to move the hand in a vertical direction;

a storage to store in advance the three-dimensional models of the hand, the horizontal link, the plate-shaped member, the hand attachment member, and the body, wherein the controller is configured or programmed to determine whether or not the interference determination targets including the vertical link interfere with each other; and a cover to cover a drive operable to rotate the plate-shaped member; wherein:

the controller is configured or programmed to determine whether or not the interference determination targets including the cover interfere with each other;

the cover is attached to the vertical link; and the three-dimensional model of the cover is set separately from the three-dimensional model of the vertical link, and has vertical and horizontal lengths set with respect to a rotation axis of the horizontal link.

12. The dual-arm robot system according to claim 11, wherein the horizontal link of each of the first robot arm and the second robot arm includes a first horizontal link rotatably connected to the body, and a second horizontal link rotatably connected to the first horizontal link; and the controller is configured or programmed to determine whether or not the interference determination targets including the hand interfere with each other excluding interference between the first horizontal link of the first robot arm and the first horizontal link of the second robot arm.

13. The dual-arm robot system according to claim 11, wherein the controller is configured or programmed to determine whether or not the hand and the body interfere with each other in each of the first robot arm and the second robot arm.

14. The dual-arm robot system according to claim 11, further comprising:
  another vertical link provided on a tip end side of each of the first robot arm and the second robot arm, the another vertical link being operable to move along the vertical direction, wherein:
    the storage stores in advance the three-dimensional models of the hand, the horizontal link, the body, and the another vertical link; and
    the controller is configured or programmed to determine whether or not the interference determination targets interfere with each other based on the three-dimensional models stored in advance in the storage.

15. The dual-arm robot system according to claim 11, wherein
  the three-dimensional models of the horizontal link and the body are set based on a coordinate system of the body; and
  the three-dimensional model of the hand is set based on tip end coordinates of the hand.

16. The dual-arm robot system according to claim 11, further comprising:
  a housing on which the body is placed and in which the controller is arranged; wherein
    the controller is configured or programmed to determine whether or not the interference determination targets including the housing interfere with each other.

17. The dual-arm robot system according to claim 16, further comprising:
  a first cable inside the housing and the body to connect the controller arranged inside the housing to the first robot arm and the second robot arm; and
  a second cable outside the housing and the body.

18. The dual-arm robot system according to claim 11, wherein the controller is configured or programmed to determine whether or not the interference determination targets including an object arranged around the first robot arm and the second robot arm interfere with each other.

19. The dual-arm robot system according to claim 11, wherein the controller is provided in common for the first robot arm and the second robot arm.

20. The dual-arm robot system according to claim 11, wherein
  the controller is configured or programmed to control operations of the first robot arm and the second robot arm in addition to determining whether or not the interference determination targets interfere with each other; or
  the dual-arm robot system further comprises an operation controller configured or programmed to control the operations of the first robot arm and the second robot arm, separately from the controller configured or programmed to determine whether or not the interference determination targets interfere with each other.

* * * * *